June 9, 1959 J. J. NEWMAN 2,890,288
MAGNETIC RECORDING
Filed Dec. 1, 1954
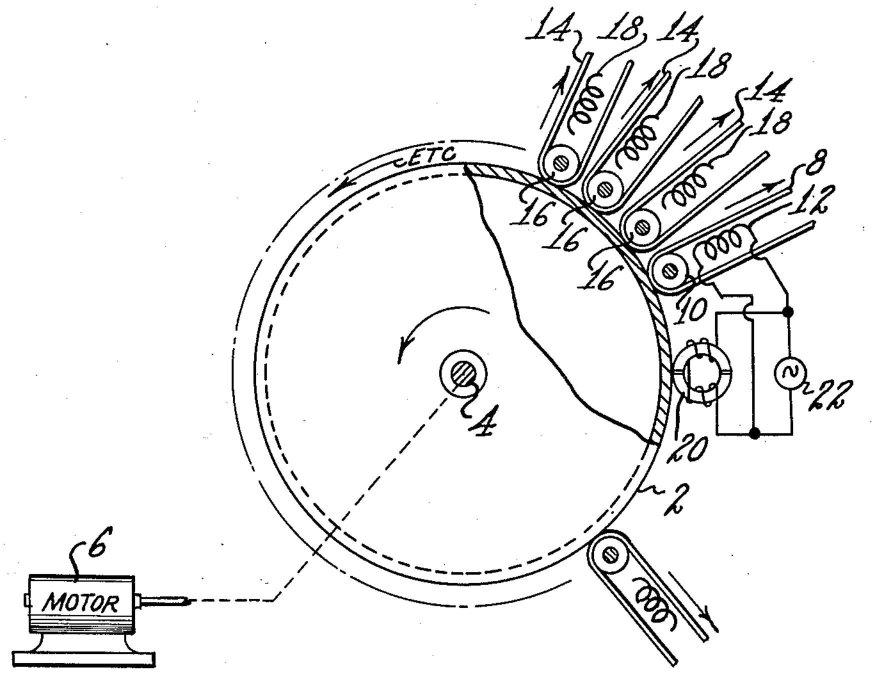
INVENTOR.
JAY J. NEWMAN
BY
ATTORNEY 2,890,288
Patented June 9, 1959

2,890,288

MAGNETIC RECORDING

Jay J. Newman, Westmont, N.J., assignor to Radio Corporation of America, a corporation of Delaware Application December 1, 1954, Serial No. 472,356
8 Claims. (Cl. 179—100.2)

This invention relates to magnetic recording, and more particularly to apparatus for producing a multiplicity of copies of a master record.

It has been found desirable to provide prerecorded magnetic records. These records are particularly suitable for the reproduction of high quality music. However, in providing such prerecorded magnetic records, means must also be provided for duplicating a master recording. In the production of disk records, multiple copies are relatively readily produced by making a metal stamper and using the stamper to mold a quantity of plastic material. Such simple structure is obviously not applicable to the duplication of magnetic records. Systems have been proposed wherein a playback transducer is operatively associated with a master record, a signal is thereby generated, amplified, then applied to a plurality of blank tapes through associated recording transducers. Other systems have been proposed wherein a blank tape is moved into contact relationship with a master record tape in the presence of a bias field thereby inductively transferring the recorded information from the master record to the copy. Such systems have not proved to be entirely satisfactory.

Accordingly, it is an object of the present invention to provide improved means for effecting the multiple duplication of magnetic records.

It is another object of the present invention to provide improved magnetic record duplicating means as set forth wherein a single master record need be used but once to provide a large number of duplicate records.

A further object of the present invention is to provide improved magnetic record duplicating means as set forth wherein the master record is not brought into physical contact with the duplicate record members.

In accomplishing these and other objects, there has been provided, in accordance with the present invention, a duplicating system wherein a master magnetic record tape is caused to travel into physical contact with a magnetizable surface of a relatively large drum and in the presence of a magnetic bias field thus transferring the record information to the surface of the drum. A plurality of blank copy tapes are caused to be driven into surface contact with the aforesaid drum in a position to contact the drum subsequent to the transference of the record information to the drum. The copy tapes are also subjected to magnetic bias fields in the area of contact with the surface of the drum. An erase head is provided in operative association with the drum, ahead of the master tape to prepare the drum for the reception of information from the master tape.

A better understanding of this invention may be had from the following detailed description when read in connection with the accompanying drawing in which:

The single figure is a schematic representation of apparatus embodying the present invention.

Referring now to the drawing in more detail, there is shown a drum 2 which may be made of nonmagnetic material and be provided with a coating or surface layer of a suitable magnetizable material. Suitable means are provided for rotating the drum 2 about its axis 4. This means is represented in the drawing by a motor 6 operatively coupled to the drum 2.

A master record tape 8 has had program material previously recorded thereon by any suitable known means. The master record tape 8 is passed about a roller 10 which presses the face of the tape into engagement with the coated surface of the drum 2. Suitable means such as the induction coil 12 is provided for applying an oscillatory magnetic bias field to the tape 8 as it passes in contact with the surface of the drum 2. The bias field, as developed by the induction coil 12, assists in effecting the inductive transfer of signal information from the master record tape 8 to the magnetizable surface on the drum 2.

Since the surface of the drum 2 is in physical contact with the surface of the master record tape, the two surfaces will be travelling at the same linear velocity. Thus even if the velocity at which the drum 2 is driven should happen to be somewhat irregular, such irregularity will not result in the introduction of wow or flutter in the information recorded thereon, assuming, of course, that no wow or flutter was present during the original recording on the master record tape 8.

After the signal has been transferred to the surface of the drum, that surface then is used as an intermediate master. That is, the signal on the drum 2 will be transferred to other record members. A preferred means for effecting the transfer of the information from the drum to the other members is illustrated in the drawing wherein a plurality of blank record receiving tapes 14 are passed about rollers 16 which, in turn, press these tapes 14 into engagement with the surface of the drum 2. These tapes 14 with their associated rollers are arranged in radial and sequential array about the periphery of the drum 2. Again, means such as induction coils 18 are provided for imposing a magnetic bias field upon the structure of the associated drums and blank tapes at the places where the tapes engage the surface of the drum. Thus the signals recorded onto the drum from the master record may be transferred to the blank tapes. These tapes, thereupon, become duplicates of the master record. It will be appreciated that the number of such copying stations or duplicating stations will be determined largely by the physical dimension of the drum and the relationship thereto of the dimension of the rollers 10 and 16.

Here, too, since the duplicate tapes were driven in physical contact with the surface of the drum, the linear velocity will be identical with that of the drum and hence identical with that of the master record.

Subsequent to the last duplicating station about the periphery of the drum but prior to the position of the master record tape 8, there is positioned an erasing head 20. Although the master record tape may be of substantial length, say for example, on the order of 1200 ft., the drum may be effectively used to transfer the entire signal from the master tape to the several duplicating tapes although the circumference of the drum is only a fractional portion of the length of the tape. The erasing head 20 and the several induction coils 12 and 18 are supplied from a suitable source of alternating current 22.

Thus, it may be seen that there has been provided an improved means for effecting the multiple duplication of magnetic records which is characterized in simplicity of structure and operation.

What is claimed is:

1. Apparatus for producing copies of a magnetic record master tape comprising a rotatable drum having a magnetizable peripheral surface, means for effecting a contact transfer of recorded information from said master to said peripheral surface of said drum as said drum rotates, means for advancing a magnetic copy tape into contact with said peripheral surface, and means for effecting the contact transfer of said recorded information from said drum to said copy tape during the rotation of said drum.

2. Apparatus for producing copies of a magnetic record master tape comprising a rotatable drum having a magnetizable peripheral surface, means for moving said master tape into contact with said peripheral surface of said drum, means for applying a magnetic bias field to said peripheral surface during said contact with said master tape whereby to inductively transfer recorded information from said master tape to said peripheral surface as said drum rotates, means for moving a plurality of magnetic copy tapes into contact with said peripheral surface, and means for applying a magnetic bias field to said copy tapes during said contact whereby to inductively transfer said record information from said peripheral surface to each of said copy tapes during rotation of said drum.

3. Apparatus for producing copies of a magnetic record master tape comprising a drum having a magnetizable peripheral surface, said drum being rotatable around the axis thereof, roller means adjacent to said peripheral surface and rotatable with said drum around an axis parallel to said drum axis for guiding said master tape into engagement with said peripheral surface and for movement therewith, means for applying an alternating magnetic bias field to said peripheral surface during said contact with said master tape whereby to inductively transfer record information from said master tape to said drum, a plurality of roller members adjacent to and successively spaced about said peripheral surface and rotatable with said drum around axes parallel to said drum axis, each of said second mentioned rollers being positioned to guide a magnetic copy tape into engagement with the surface of said drum and for movement therewith, and means associated with each of said second mentioned rollers for applying a magnetic bias field to said copy tapes during said contact whereby to inductively transfer said record information from said peripheral surface of said drum to each of said copy tapes.

4. Apparatus for producing copies of a magnetic record master tape comprising a drum having a magnetizable peripheral surface, said drum being rotatable around the axis thereof, roller means adjacent to said peripheral surface and rotatable with said drum around an axis parallel to said drum axis for guiding said master tape into engagement with said peripheral surface and for movement therewith, means for applying an alternating magnetic bias field to said peripheral surface during said contact with said master tape whereby to inductively transfer record information from said master tape to said drum, a plurality of roller members adjacent to and successively spaced about said peripheral surface and rotatable with said drum around axes parallel to said drum axis, each of said second mentioned rollers being positioned to guide a magnetic copy tape into engagement with the surface of said drum and for movement therewith, means associated with each of said second mentioned rollers for applying a magnetic bias field to said copy tapes during said contact whereby to inductively transfer said record information from said peripheral surface of said drum to each of said copy tapes, and signal erasing means positioned in operative relation with said peripheral surface of said drum whereby to erase signals on said drum prior to its being contacted by said master tape.

5. Apparatus for duplicating a recorded master record on a blank record with the aid of another record, said apparatus comprising means for transporting said other record along a path, a first duplicating station, a second duplicating station, said stations being spaced from each other along said path, means included in said first duplicating station for transferring signals from said master record to said other record as it moves along said path to provide an intermediate master record, and means included in said second duplicating station for transferring signals from said intermediate master record to said blank record while said intermediate master record is in motion along said path.

6. Apparatus as set forth in claim 5 including at least one other duplicating station spaced along said path after said second duplicating station, and means included in said other duplicating station for transferring signals from said intermediate master record to still another blank record while said intermediate master record is in motion along said path.

7. Apparatus according to claim 5 wherein all of said records are magnetic records.

8. Apparatus according to claim 5 wherein said intermediate master record is an endless record.

References Cited in the file of this patent

UNITED STATES PATENTS

| | | |
|---|---|---|
| 2,115,803 | Dudley | May 3, 1938 |
| 2,540,654 | Cohen | Feb. 6, 1951 |
| 2,723,315 | Howell | Nov. 8, 1955 |
| 2,747,026 | Camras | May 22, 1956 |

FOREIGN PATENTS

| | | |
|---|---|---|
| 137,519 | Sweden | July 17, 1952 |